US008458470B2

(12) United States Patent
Banerjee et al.

(10) Patent No.: US 8,458,470 B2
(45) Date of Patent: Jun. 4, 2013

(54) AUTHENTICATION IN DATA MANAGEMENT

(75) Inventors: Dwip N. Banerjee, Austin, TX (US);
Abhinay R. Nagpal, Maharashtra (IN);
Sandeep R. Patil, Somers, NY (US);
Yan W. Stein, San Jose, CA (US)

(73) Assignee: International Business Machinces Corporation, Armonk, NY (US)

( * ) Notice: Subject to any disclaimer, the term of this patent is extended or adjusted under 35 U.S.C. 154(b) by 441 days.

(21) Appl. No.: 12/790,767

(22) Filed: May 28, 2010

(65) Prior Publication Data

US 2011/0296183 A1 Dec. 1, 2011

(51) Int. Cl.
*H04L 9/00* (2006.01)
(52) U.S. Cl.
USPC ........................................ 713/168; 713/170
(58) Field of Classification Search
USPC .............. 726/26–30; 713/150, 161, 165–170; 380/277, 46, 47
See application file for complete search history.

(56) References Cited

U.S. PATENT DOCUMENTS 7,065,650 B2 * 6/2006 Collins et al. ................. 713/176
8,041,945 B2 * 10/2011 Sydir et al. ................... 713/161

OTHER PUBLICATIONS

Garman, Jason. "Kerberos: The Definitive Guide." Sebastopol, CA: O'Reilly, Aug. 2003.
Massachusetts Institute of Technology. "Upgrading to Triple-DES Encryption Keys." Kerberos V5 Installation Guide. Massachusetts Institute of Technology, 2007.
Linder, Wolfgang and Meier, Jorg. "Towards a Secure Data Stream Management System." Cambridge, MA: Lecture Notes in Computer Science, vol. 3888, pp. 114-128, 2006.
Chaudhry, Nauman; Shaw, Kevin; Abdelguerfi, Mahdi (Eds.). "Stream Data Management." Advances in Database Systems, vol. 30, pp. 40, Apr. 2005.
Lee, Ken C.K.; Leong, Hong VA; Si, Antonio. "QUAY: A Data Stream Processing System Using Chunking." IEEE: International Database Engineeering and Applications Symposium, 2004.
Raeburn, K. "Encryption and Checksum Specifications for Kerberos 5." Massachusetts Institute of Technology: RFC 3961, Feb. 2005.
Biryukov, Alex. "Block Ciphers, Stream Ciphers and the Creatures in Between." Dagstuhl, Germany: Univeristy of Luxembourg, Jan. 2007.
Goebel, Vera and Plagemann, Thomas. "Data Stream Management Systems—A Technology for Network Monitoring and Traffic Analysis?" Zagreb, Croatia: 8th International Conferene on Telecommunications, Jun. 2005.
Hoppe, A. and Gryz, J.. "Stream Processing in a Relational Database: A Case Study." York University, Toronto: International Database Engineering and Applications Symposium, Sep. 2007.
Ligocki, N.P.; Hara, C.S.. Lyra, C.. "A Flexible Network Monitoring Tool Based on a Data Stream Management System." IEEE: Computers and Communications, Jul. 2008.
Bertino, Elisa; Nehme, Rimma V.; Rundensteiner, Elke A.. "Security and Privacy in Data Stream Management Systems." Purdue University, West Lafayette, IN: CERIAS Tech Report, 2006.
Bjorstad, Tor E.. "An Introduction to New Stream Cipher Designs." Berlin, Germany: 25th Chaos Communication Congress, Dec. 2008.

* cited by examiner

*Primary Examiner* — Hosuk Song
(74) *Attorney, Agent, or Firm* — Century IP Group, Inc.; F. Jason Far-hadian, Esq.

(57) ABSTRACT

Systems and methods for authentication in a data management system are provided. In one embodiment, the method comprises identifying a plurality of data ciphers based on a pre-defined set of properties associated with a plurality of data sources; and generating an authentication response having at least a subset of the identified plurality of data ciphers, wherein the authentication response authenticates access to at least some data sources from among the plurality of data sources.

12 Claims, 5 Drawing Sheets

AUTHENTICATION IN DATA MANAGEMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to databases and data management systems and, more particularly, to an authentication scheme in a data management system.

BACKGROUND

Traditional databases are generally utilized for storing data that is not constantly changing in value (i.e., persistent data). Some data is generated in the form of a data stream to support constantly changing data values in real-time applications (e.g., sensor data, Internet traffic, financial tickers, on-line auctions, and transaction logs such as Web usage logs and telephone call records).

As such, a data stream is a real-time, continuous, ordered (implicitly by arrival time or explicitly by timestamp) sequence of items. Often, the order in which items in a data stream arrive is difficult to manage. Further, the local storage of data streams is not practical using the traditional database models which are mainly designed to handle persistent data management tasks such as relational queries.

To address the above, real-time databases have been designed to handle data types with values that change very often. For example, data that reflects value changes in the financial markets may need to be updated every second. Real-time processing is meant to provide for the speedy processing of data with almost instantaneous calculation of the intended results. Real-time databases are used in the following exemplary applications: accounting, banking, law, medical records, multi-media, process control, reservation systems, and scientific data analysis.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Systems and methods for authentication in a data management system are provided. In one embodiment, the method comprises identifying a plurality of data ciphers based on a pre-defined set of properties associated with a plurality of data sources and generating an authentication response having at least a sub-set of the identified plurality of data ciphers, wherein the authentication response authenticates access to at least some data sources from among the plurality of data sources.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In one or more embodiments, an authentication protocol (e.g., Kerberos protocol) is utilized to provide an authentication mechanism in a data management system. An authentication protocol is designed to provide reliable authentication over open and unsecured networks. In one embodiment, the state of authentication servers, application servers and client systems is updated so that the authenticity of requesting users and service providers may be maintained.

A data stream management system (DSMS) is a data management system that provides certain additional features above those provided by the traditional database management systems (DBMS). DSMS is referred to as a real time database and is designed to manage real-time data streams, in contrast to traditional databases that are generally limited to supporting persistent data storage and relational queries.

In one exemplary embodiment, an authentication system may use an authentication protocol for per message encryption, where two types of encryption algorithms are supported.

The first algorithm may be a block based algorithm (e.g., block cipher or AES/DES). The second algorithm may be a stream based algorithm (e.g., stream cipher or RC4). The stream based algorithm is more suitable for live streaming data and the block based algorithm is suitable for persistently stored data.

In one embodiment, a client may fetch an authentication ticket for authentication and encryption of data in a database. The database may support traditional DBMS as well as DSMS, but the generated ticket may support one encryption type and not the other. For example, if the cipher for the received ticket is a block cipher, the ticket will be supported by a DBMS but is not suited for DSMS related data operations.

Figure 1:
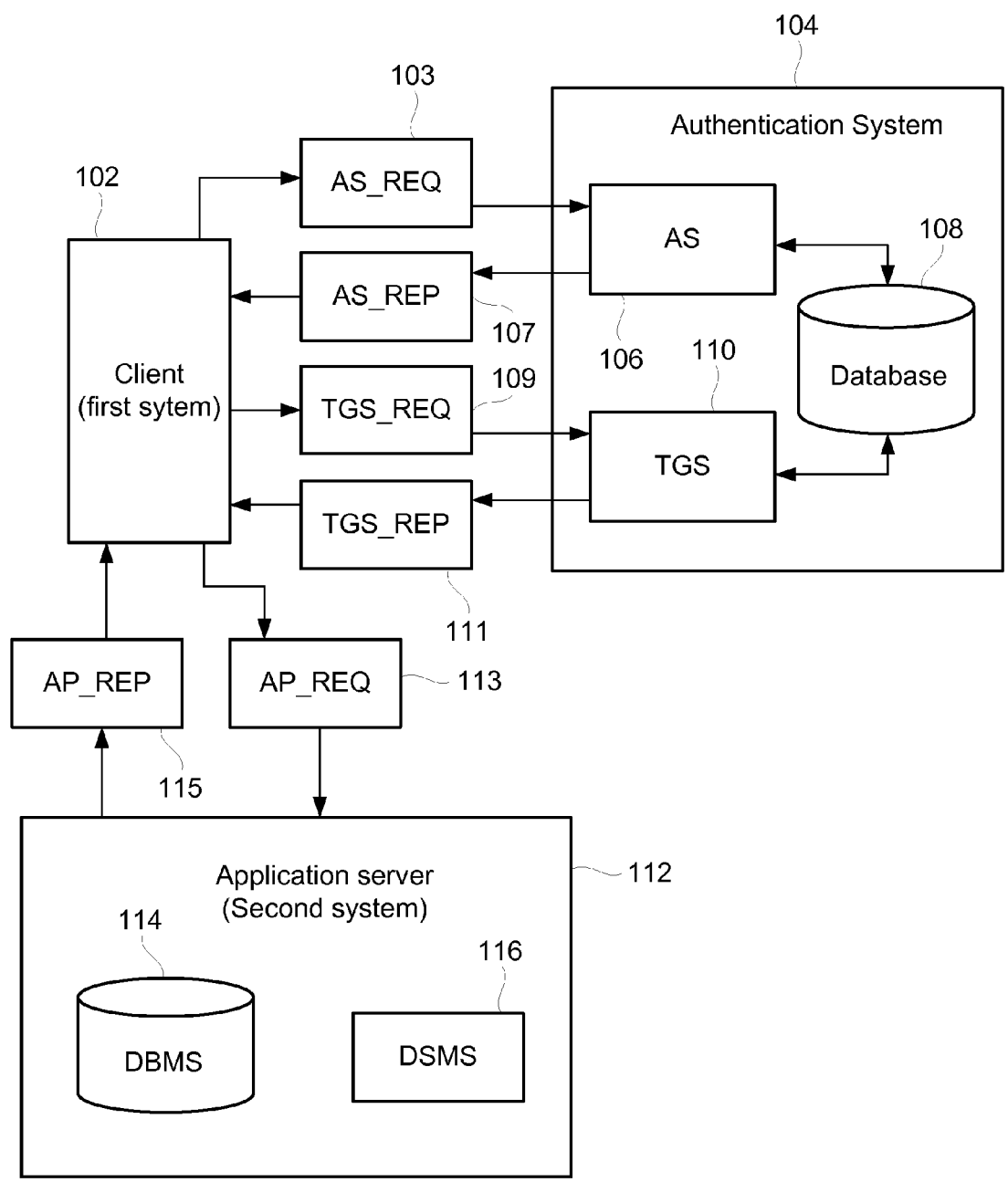
FIG. 1 depicts a block diagram of an authentication system used an exemplary data management environment, in accordance with one embodiment.

Referring to FIG. 1, in an exemplary embodiment, an exemplary authentication environment with a server having two different data types is illustrated. The exemplary authentication environment 100 includes a client (first system) 102, an authentication system 104 and an application server (second system) 112. Application server 112, in an exemplary mode, includes two disparate data sources having two different data types, i.e., a DBMS 114 and a DSMS 116.

One or more embodiments are disclosed here as utilizing Kerberos protocol for the purpose of supporting communication between server and client machines in a data management system. It is noteworthy, however, that reference to utilization of the Kerberos protocol is suggested as an example and the scope of the subject matter disclosed herein is not to be construed as limited to said exemplary embodiments.

In one embodiment, client 102 may attempt to access application server 112 and authenticate with application server 112. The authentication system 104 may be logically considered to be divided into three parts: a database 108, an authentication server (AS) 106 and a ticket granting server (TGS) 110. Database 108 includes entries associated with a plurality of clients, one of which is client 102 and a plurality of service providers, one of which is application server 112.

The authentication server (AS) 106 replies to the initial authentication request (AS_REQ) 103 from the client 102. When a user of client 102, is not yet authenticated, the authentication may be performed by entering a password. In response to authentication request 103, authentication server 106 issues a ticket known as the ticket granting ticket, or more briefly TGT. If one or more users successfully authenticate, the users may use the TGT to obtain other service tickets, without having to re-enter a password. Ticket granting server (TGS) 110 distributes service tickets to clients with a valid TGT, guaranteeing the authenticity of the identity for obtaining the requested resource on the application servers (AP) 112. In a Kerberos system there are three handshakes (i.e., (AS_REQ 103, AS_REP 107), (TGS_REQ 109, TGS REP 111) and (AP_REQ 113, AP_REP 115)) for example, where "REQ" stands for request and "REP" stands for reply.

A ticket, also referred to as "authentication" in this document, is presented by a client 102 to application server 112 to validate the authenticity of the client's identity. Tickets are issued by authentication system 104 and are encrypted using the secret key of the service they are intended for. Since this key is a secret shared between the authentication server and the server providing the service, not even the client which requested the ticket knows the key or is able to change the respective contents. Each ticket has a corresponding expiration, since authentication system 104 may no longer have control over an already issued ticket.

The users and services share a secret with authentication system 104. For users, this secret is the key derived from their password, while for services, the secret is their secret key (set by their administrator). These keys are long term keys, since the keys do not change when the work session changes. However, the user may share a secret with the service, at least for the time in which client 102 has a work session open on a server. A key, generated by authentication system 104 when a ticket is issued, is called the session key. The copy intended for the service is enveloped by authentication system 104 in the ticket, while the copy intended for the user is encapsulated in an encrypted packet with the user long term key. The session key plays a fundamental role in demonstrating the authenticity of the user.

In one embodiment, communication between client 102 and authentication system 104 and between client 102 and application server 112 during authentication is accomplished as provided in further detail below. It is noteworthy that, in one embodiment, application server 112 does not directly communicate with the authentication system 104. That is, the service tickets, even if packeted by TGS 110, reach application server 112 desirably through client 102 wishing to access them.

In one implementation, AS_REQ 103 may be an initial user authentication request directed to the authentication server (AS) 106. AS_REP 107 is the reply of authentication Server 106 to the request AS_REQ 103. The request includes the TGT (encrypted using the TGS secret key) and the session key (encrypted using the secret key of the requesting user). TGS_REQ 109 is the request from client 102 to the ticket granting server (TGS) 110 for a service ticket and includes the TGT obtained from the initial authentication request and an authenticator generated by client 102 and encrypted with the session key. TGS_REP 111 is the reply of ticket granting server (TGS) 110 to the previous request.

Located inside TGS_REP 111 is the requested service ticket (encrypted with the secret key of the service) and a service session key generated by TGS 110 and encrypted using the previous session key generated by the AS 106. AP_REQ (an authentication) 113 is the request that client 102 sends to an application server 112 to access a service. The components are the service ticket obtained from TGS 110 with the previous reply and an authenticator again generated by client 102 encrypted using the service session key (generated by TGS 110). AP_REP 115 is the reply that application server 112 gives to client 102 to prove that it really is the server application that client 102 is expecting. This packet is not always requested. The client requests the server for the packet in case of mutual authentication.

Figure 2:
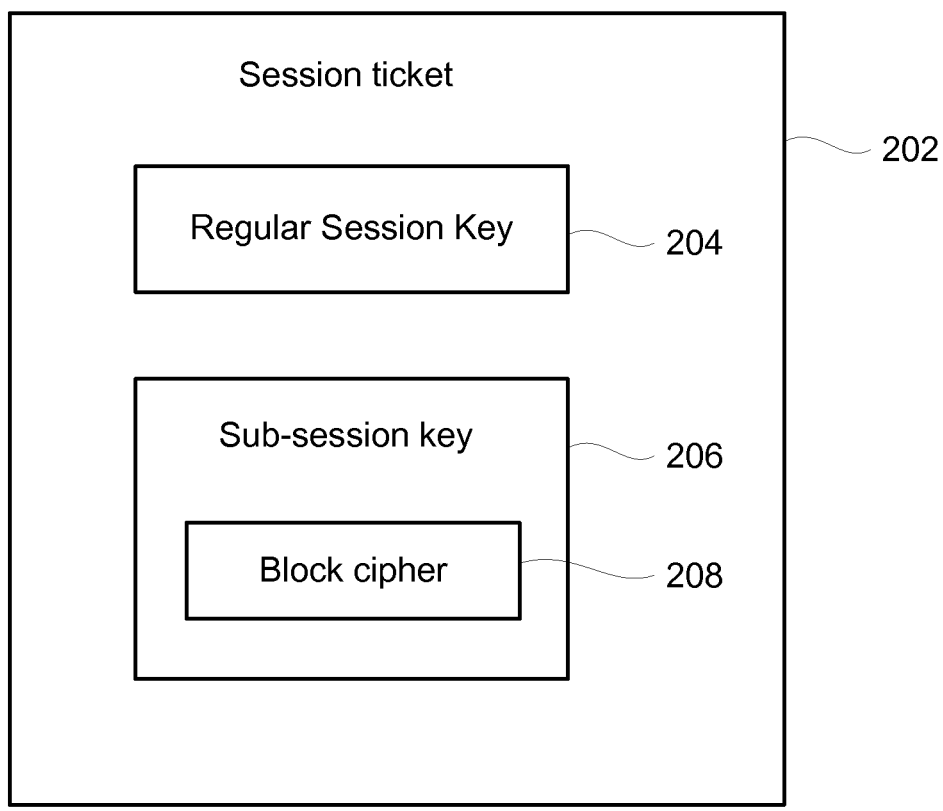
FIG. 2 is a block diagram of an exemplary session ticket for an authentication system, in accordance with one embodiment.

Referring to FIG. 2, an exemplary session ticket 202 is provided. Session ticket 202 includes a regular session key 204, a sub-session key 206 which is adapted for either a block or a stream cipher. Exemplary sub-session key 206 includes a block cipher 208. TGS Reply TGS_REP 111 of FIG. 1 may include the following:

$TGS\_REP = \{Principal_{Service}, Timestamp, Lifetime, SK_{Service}\}_{SKTGS}\{T_{Service}\}K_{Service}$, where, $T_{Service} = (Principal_{Client}, Principal_{Service}, IP\_list, Timestamp, Life-time, SK_{Service})$ 'Principal' refers to the entries in the authentication system database 108 of FIG. 1. '$Principal_{Client}$' is the principal associated with the user at client 102 of FIG. 1, seeking authentication. '$Principal_{Service}$' is the principal associated with the service the ticket is being asked for (e.g., a text string). 'IP_list' is a list of IP addresses that indicate to a host where it is possible to use the ticket which will be issued. 'Lifetime' is the maximum validity time (requested) for the ticket to be issued. '$SK_{Service}$' is the session key that will be used for per message encryption.

Figure 3:
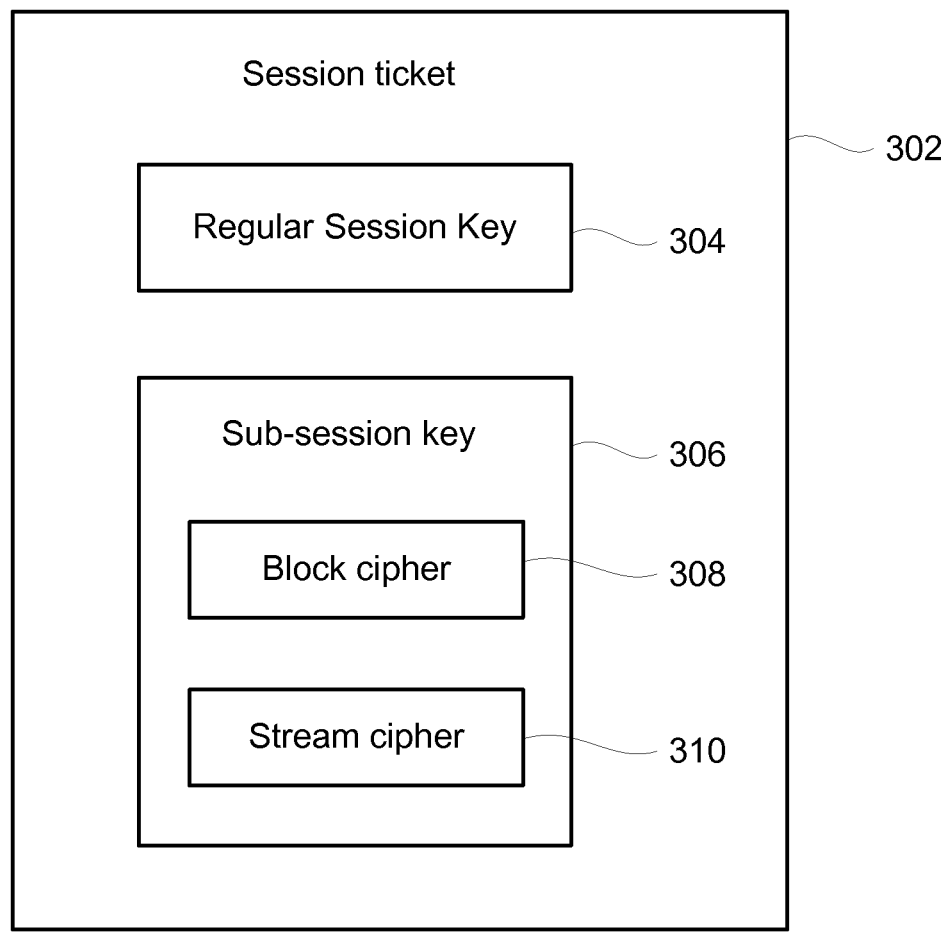
FIG. 3 is a block diagram of a session ticket of an authentication system, in accordance with an exemplary embodiment.

FIG. 3 shows a schematic 300 of a session ticket of authentication in accordance with an exemplary embodiment which provides an improvement over the session ticket illustrated in FIG. 2. When TGS_REP 111 of FIG. 1 is being formulated for application server 112 serving both DBMS 114 and DSMS 116, $SK_{Service}$ is implemented to provide the session key support for both types of ciphers (stream as well as block).

Referring to FIGS. 1 and 3, in one embodiment, authentication server 104 may modify principal and explicitly associate stream as well as block encryption types to the principal being created in database 108. Session ticket 302, according to an exemplary embodiment, further includes a regular session key 304 and a sub-session key 306. Exemplary sub-session key 306 includes both a block cipher 308 and a stream cipher 310.

In one embodiment, a modified TGS Reply typically includes the following:

$$TGS\_REP=\{Principal_{Service}, Timestamp, Lifetime, SK_{Service}\}SK_{TGS}\{T_{Service}\}K_{Service}$$

where, $$T_{Service}=(Principal_{Client}, Principal_{Service}, IP\_list, Timestamp, Life-time, SK_{Service})$$

where, $SK_{Service}=(SK\text{-}sub1_{BLOCK}, SK\text{-}sub1_{STREAM})$

As such, the modified session key supports two cipher types. The modified session key is used in the authentication by client to access application server.

Figure 4:
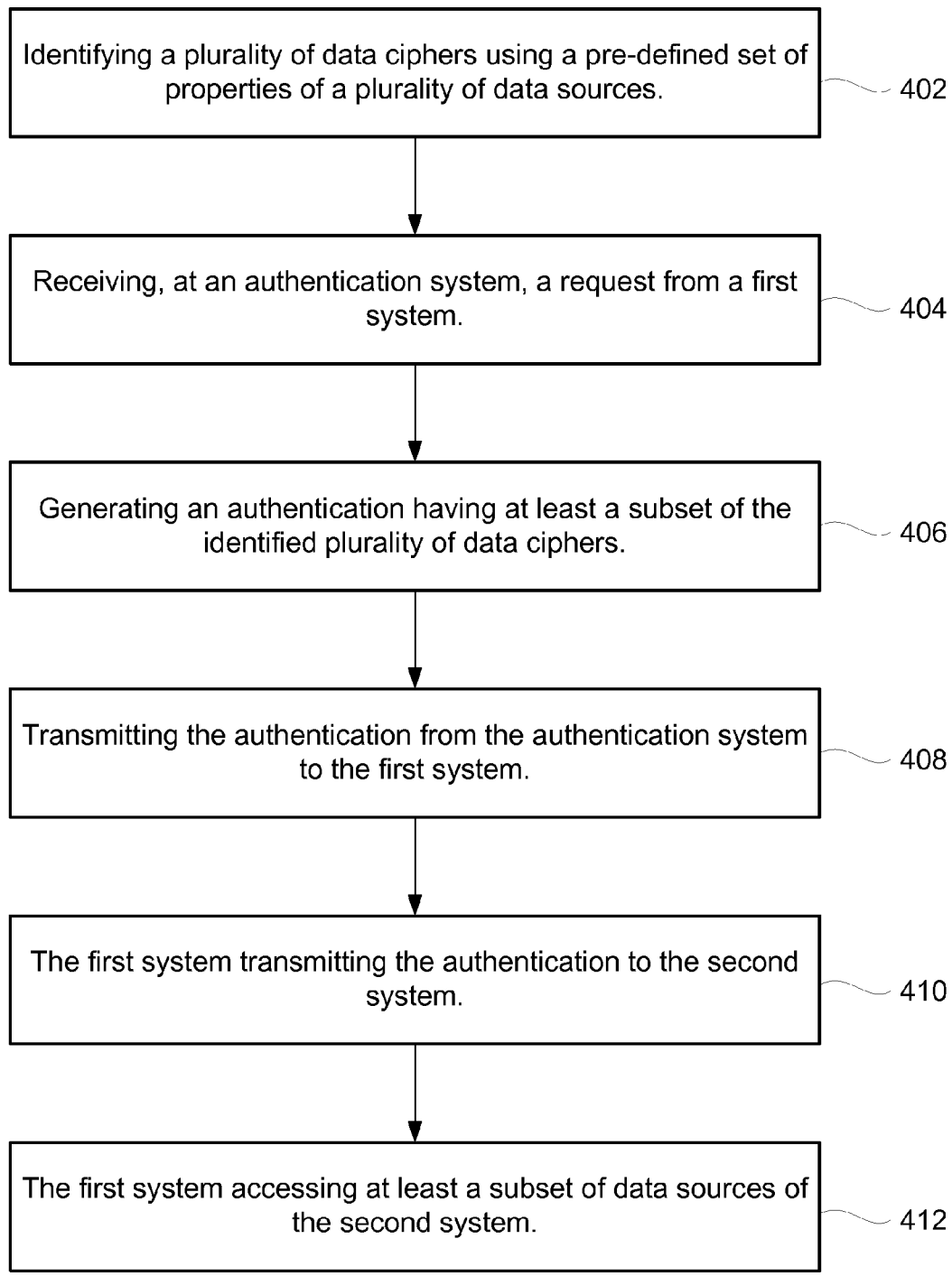
FIG. 4 is a flow diagram of an authentication method in a data management system, according to an exemplary embodiment.

Referring to FIG. 4, a flow diagram of a method 400 for authentication in an exemplary data management system is provided. Process 402 shows identifying a plurality of data ciphers using a pre-defined set of properties for a plurality of data sources. The pre-defined set of properties comprises latency and persistency of data. The plurality of data sources includes a first data type and a second data type and a first data cipher corresponds to the first data type and a second data cipher corresponds to the second data type.

In an exemplary embodiment, the first data type is a block data type and the first data cipher is a block data cipher. The second data type is a stream data type and the second data cipher is a stream data cipher. Process 404 depicts receiving, at an authentication system, a request from a first system communicatively coupled to the authentication system. Process 406 depicts generating an authentication response having at least a subset of the identified plurality of data ciphers. The authentication response is a tag including a session key. The authentication response authenticates the first system to access the plurality of data sources on a second system communicatively coupled to the first system. Process 408 depicts transmitting the authentication response from the authentication system to the first system. Process 410 shows the first system transmitting the authentication response to the second system. Process 412 shows the first system accessing at least a subset of data sources of the second system.

According to the above authentication scheme, the security provided by an authentication protocol may be enhanced by way of providing an authentication mechanism that is aware of the presence of DBMS and DSMS data management systems within the same data management environment. A session ticket is created by the authentication system using an authentication protocol so that a client may interact with a server. If it is determined that the server supports two different data management types (e.g., DBMS and DSMS), the authentication system creates a sub-session key with two cipher types (e.g., a block cipher type, and a stream cipher type) in the same session ticket, along with the regular session key. In this manner, the client may use stream cipher for communication with the server when communicating with DSMS and block cipher when communicating with DBMS.

Figure 5:
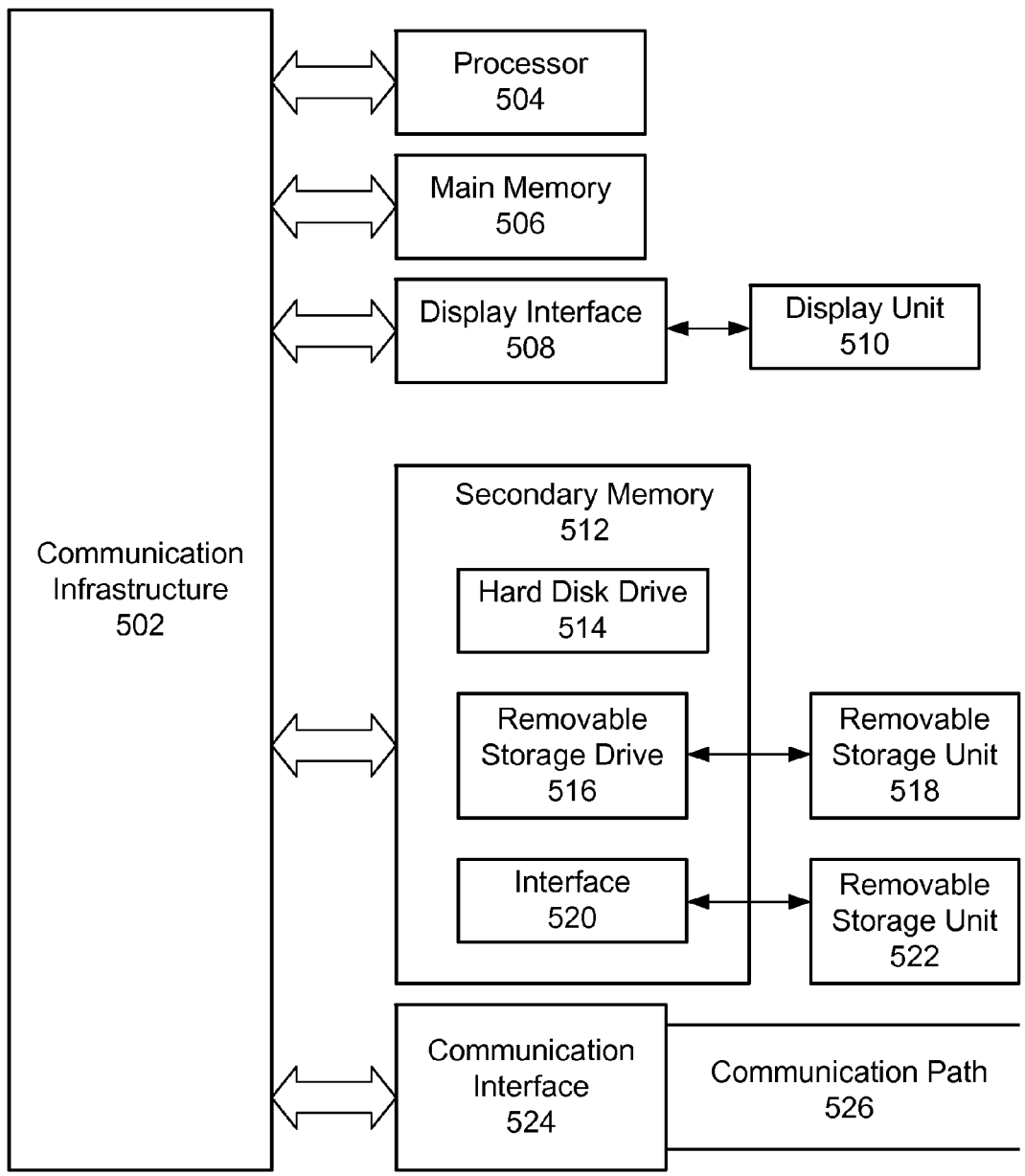
FIG. 5 is a block diagram of an exemplary computer system used for authentication in a data management system, in accordance with one embodiment.

FIG. 5 is a block diagram of an exemplary computer system 500 that can be used for implementing one or more embodiments. In some embodiments, the computer system 500 can be used as a server adapted to generate the session ticket as shown in FIG. 3. The computer system 500 can also be used to perform the processes described in FIG. 4. The Computer system 500 includes a processor 504. It should be understood although FIG. 5 illustrates a single processor, one skilled in the art would appreciate that more than one processor can be included as needed. The processor 504 is connected to a communication infrastructure 502 (for example, a communications bus, cross-over bar, or network) where the communication infrastructure 504 is configured to facilitate communication between various elements of the exemplary computer system 500. Various software embodiments are described in terms of this exemplary computer system. After reading this description, it will become apparent to a person of ordinary skill how to implement the disclosed subject matter using other computer systems and/or computer architectures.

Exemplary computer system 500 may include a display interface 508 configured to forward graphics, text, and other data from the communication infrastructure 502 (or from a frame buffer not shown) for display on a display unit 510. The computer system 500 also includes a main memory 506, which can be random access memory (RAM), and may also include a secondary memory 512. The secondary memory 512 may include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a manner well known to those having ordinary skill in the art. The removable storage unit 518, represents, for example, a floppy disk, magnetic tape, optical disk, etc. which is read by and written to by the removable storage drive 516. As will be appreciated, the removable storage unit 518 includes a computer usable storage medium having stored therein computer software and/or data.

In exemplary embodiments, the secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to the computer system 500.

The computer system 500 may also include a communications interface 524. The communications interface 524 allows software and data to be transferred between the computer system and external devices. Examples of the communications interface 524 may include a modem, a network interface (such as an Ethernet card), a communications port, a PCM-CIA slot and card, etc. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. These propagated signals are provided to the communications interface 524 via a communications path (that is, channel) 526. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the disclosed subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments further provide a storage medium tangibly embodying a program of machine-readable instructions executable by a digital processing apparatus to carry out a method of authentication in data management as described in the various embodiments set forth above and described in detail.

The disclosed systems and methods provide improved performance in data management where a plurality of data source types exists, by exploiting a plurality of characteristics of the encryption types supported by the data management system without compromising the security aspects.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.].

Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices.

Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. One embodiment, may be implemented in software, which includes but is not limited to firmware, resident software, microcode, etc. Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although processes and methods may be described in a sequential order, such processes, methods and algorithms may be configured to work in alternate orders. In other words, any sequence or order of blocks that may be described does not necessarily indicate a requirement that the blocks be performed in that order. The processes described herein may be performed in any order practical. Further, some processes may be performed simultaneously, in parallel, or concurrently. Further, some or all processes may be performed in run-time mode.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although exemplary embodiments have been provided in detail, it should be understood that various changes, substitutions and alternations could be made thereto without departing from spirit and scope of the disclosed subject matter as defined by the appended claims. Variations described for exemplary embodiments may be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to the exemplary embodiments provided herein.

What is claimed is:

1. A computing device implemented method for data authentication, the method comprising:
   identifying, using one or more processors, at least two data ciphers, in response to detecting a pre-defined set of properties associated with at least two data sources from among a plurality of data sources in a data management system; and
   generating an authentication response supporting the at least two identified data ciphers, wherein the authentication response authenticates access to the at least two data sources,
   wherein data, stored in the plurality of data sources, comprises data associated with a first data type and data associated with a second data type,
   wherein the first data type is associated with a first data cipher and the second data type is associated with a second data cipher,
   wherein the first data type is a block data type and the first data cipher is a block data cipher, and
   wherein the second data type is a stream data type and the second data cipher is a stream data cipher.

2. The method of claim 1, wherein the pre-defined set of properties comprises latency and persistency of data.

3. The method of claim 1, further comprising:
   receiving, at an authentication system, a request from a first system communicatively coupled to the authentication system; and
   transmitting the authentication response from the authentication system to the first system.

4. The method of claim 3, wherein the authentication response is a tag including a session key.

5. The method of claim 3, wherein the authentication response authenticates the first system to access the plurality of data sources on a second system communicatively coupled to the first system.

6. The method of claim 5, wherein the first system transmits the authentication response to the second system; and accesses at least a subset of data sources of the second system.

7. A data management system comprising:
   at least one processor and at least one memory;
   a logic unit to identify a plurality of data ciphers base on a pre-defined set of properties associated with a plurality of data sources; and
   a logic unit to generate an authentication response having at least a subset of the identified plurality of data ciphers, wherein the authentication response authenticates access to at least some data sources from among the plurality of data sources,
   wherein data, stored in the plurality of data sources, comprises data associated with a first data type and data associated with a second data type,
   wherein the first data type is associated with a first data cipher and the second data type is associated with a second data cipher,
   wherein the first data type is a block data type and the first data cipher is a block data cipher, and
   wherein the second data type is a stream data type and the second data cipher is a stream data cipher.

8. The system of claim 7, wherein the pre-defined set of properties comprises latency and persistency of data, and wherein the authentication response is a tag including a session key.

9. The system of claim 7, further comprising:
   a logic unit to receive a request from a first system; and
   a logic unit to transmit the authentication response to the first system, wherein the authentication response authenticates the first system to access the plurality of data sources on a second system communicatively coupled to the first system.

10. A computer program product comprising a non-transitory computer readable storage medium having a computer readable program, wherein the computer readable program when executed on a computer causes the computer to:
    identify a plurality of data ciphers based on a pre-defined set of properties associated with a plurality of data sources; and
    generate an authentication response having at least a subset of the identified plurality of data ciphers, wherein the authentication response authenticates access to at least some data sources from among the plurality of data sources,
    wherein data, stored in the plurality of data sources, comprises data associated with a first data type and data associated with a second data type,
    wherein the first data type is associated with a first data cipher and the second data type is associated with a second data cipher,
    wherein the first data type is a block data type and the first data cipher is a block data cipher, and
    wherein the second data type is a stream data type and the second data cipher is a stream data cipher.

11. The computer program product of claim 10, wherein the pre-defined set of properties comprises latency and persistency of data, and wherein the authentication response is a tag including a session key.

12. The computer program product of claim 10, wherein the computer readable program when executed on a computer further causes the computer to:
    receive a request from a first system;
    and transmit the authentication response to the first system, wherein the authentication response authenticates the first system to access the plurality of data sources on a second system communicatively coupled to the first system.

* * * * *